US006226018B1

(12) United States Patent
Suzuki

(10) Patent No.: US 6,226,018 B1
(45) Date of Patent: May 1, 2001

(54) INK TRANSFER PRINTER

(75) Inventor: Minoru Suzuki, Tochigi (JP)

(73) Assignee: Asahi Kogaku Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/167,570

(22) Filed: Oct. 7, 1998

(30) Foreign Application Priority Data

Oct. 9, 1997 (JP) .................................................. 9-293487

(51) Int. Cl.[7] ..................................................... G01D 15/16

(52) U.S. Cl. ........................................... 346/140.1; 347/68

(58) Field of Search ................................. 347/68, 20, 54, 347/44, 75, 171, 91, 89; 346/140, 140.1

(56) References Cited

U.S. PATENT DOCUMENTS

| | | | | |
|---|---|---|---|---|
| 4,561,789 | * | 12/1985 | Saito | 347/102 |
| 4,725,860 | * | 2/1988 | Kohyama et al. | 347/91 |
| 4,731,621 | * | 3/1988 | Hayamizu et al. | 347/66 |
| 4,782,347 | | 11/1988 | Kurematsu et al. | 346/140.1 |
| 4,801,951 | * | 1/1989 | Shimazaki | 347/66 |
| 4,801,953 | * | 1/1989 | Quate | 347/46 |
| 5,481,280 | | 1/1996 | Lam et al. | 346/140.1 |
| 5,510,816 | * | 4/1996 | Hosono et al. | 347/10 |
| 6,145,976 | * | 11/2000 | Suzuki et al. | 347/91 |

FOREIGN PATENT DOCUMENTS

| | | |
|---|---|---|
| 0665106 | 8/1995 | (EP) . |
| 0719994 | 7/1996 | (EP) . |
| 61-199956 | 9/1986 | (JP) . |
| 62-267162 | 11/1987 | (JP) . |
| 5305666 | 11/1993 | (JP) . |
| 8-49960 | 2/1996 | (JP) . |
| 10-799 | 1/1998 | (JP) . |
| 90/12691 | 11/1990 | (WO) . |

OTHER PUBLICATIONS

English Language Abstract of JP 62–267162.
English Language Abstract of JP 61–199956.
An English Language abstract of JP 5–305666.
An English Language abstract of JP 8–49960.

* cited by examiner

*Primary Examiner*—John Barlow
*Assistant Examiner*—Blaise Mouttet
(74) *Attorney, Agent, or Firm*—Greenblum & Bernstein, P.L.C.

(57) ABSTRACT

An ink transfer printer comprises a film, a piezoelectric element and a support plate. A spacer is provided between the film and the support plate so that an ink space is defined by the film, the spacer and the support plate. An ink reservoir is provided for supplying ink to the ink space. A platen roller is disposed above the film, which has pores, to urge a recording sheet onto the film. The piezoelectric element vibrates relative to the film, so that the film is deformed to expand the pores. Thus, the ink passes through the pores and is transferred onto the recording sheet.

12 Claims, 5 Drawing Sheets

INK TRANSFER PRINTER

BACKGROUND OF THE INVENTION

1. Field of the Invention

The present invention relates to an ink transfer printer, by which liquid ink is transferred to a recording sheet.

2. Description of the Related Art

Conventionally, as a printer which transfers ink onto a recording sheet, such as a plain paper, there is known an ink-jet printer by which ink corpuscles are sprayed onto the recording sheet from nozzles. Such an ink-jet printer, however, has a drawback in which ink may easily clog in the nozzles. Further, in the ink-jet printer, since it is difficult to linearly align a plurality of nozzles to form a line head, it is difficult to improve the printing speed.

SUMMARY OF THE INVENTION

Therefore, an object of the present invention is to provide an ink transfer printer in which ink clogging is prevented, the printing speed is high, and electric power consumption is low.

According to the present invention, there is provided an ink transfer printer comprising a film, a piezoelectric element, an ink reservoir and a contact mechanism.

The film has pores which perforate the film. The piezoelectric element, disposed to face the film, vibrates relative to the film. The ink reservoir contains supplies ink to between the film and the piezoelectric element. The contact mechanism urges a recording sheet to contact a surface of the film positioned opposite to the piezoelectric element. The ink passes through the pores and transfers to the recording sheet due to the vibrating piezoelectric element.

The ink transfer printer may further comprise a moving mechanism that moves the recording sheet relative to the film, and a control unit that controls the piezoelectric element and the moving mechanism in accordance with image information. In this construction, a plurality of the piezoelectric elements may be linearly aligned so that a line head is formed, and the moving mechanism may move the recording sheet in a first direction perpendicular to a second direction in which the piezoelectric elements are aligned. Preferably, the contact mechanism comprises a platen roller disposed in parallel to the second direction enabling the recording sheet to be securely interposed between the platen roller and the film. The recoding sheet is moved in accordance with a rotational movement of the platen roller.

Preferably, the film is made of shape memory resin that exhibits a rubber elasticity above the glass transition temperature and exhibits a glassy state below the glass transition temperature. The glass transition temperature may be higher than 50° C.

The ink transfer printer may further comprise a heater that heats the film to above the glass transition temperature. Preferably, the heater heats the film to between 50° C. and 80° C., and more preferably to around 55° C.

BRIEF DESCRIPTION OF THE DRAWINGS

The objects and advantages of the present invention will be better understood from the following description, with reference to the accompanying drawings in which.

DESCRIPTION OF THE PREFERRED EMBODIMENTS

Figure 1:
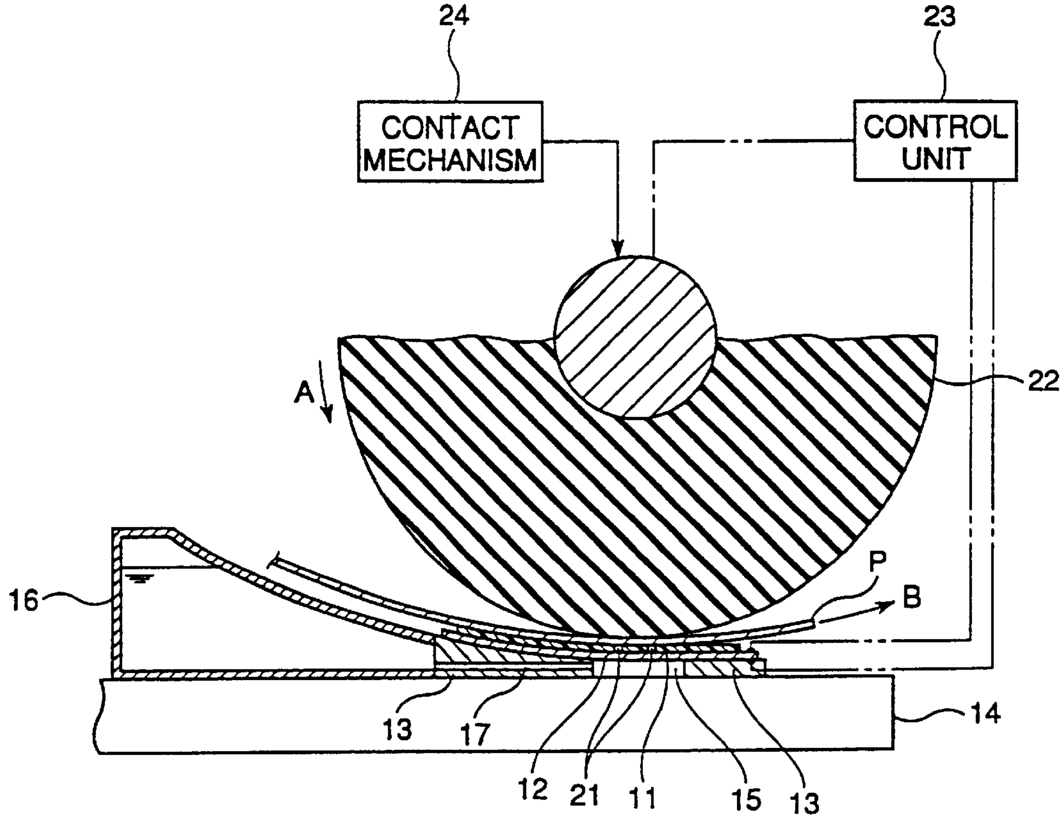
FIG. 1 is a side sectional view showing an ink transfer printer of a first embodiment of the present invention.
Figure 2:
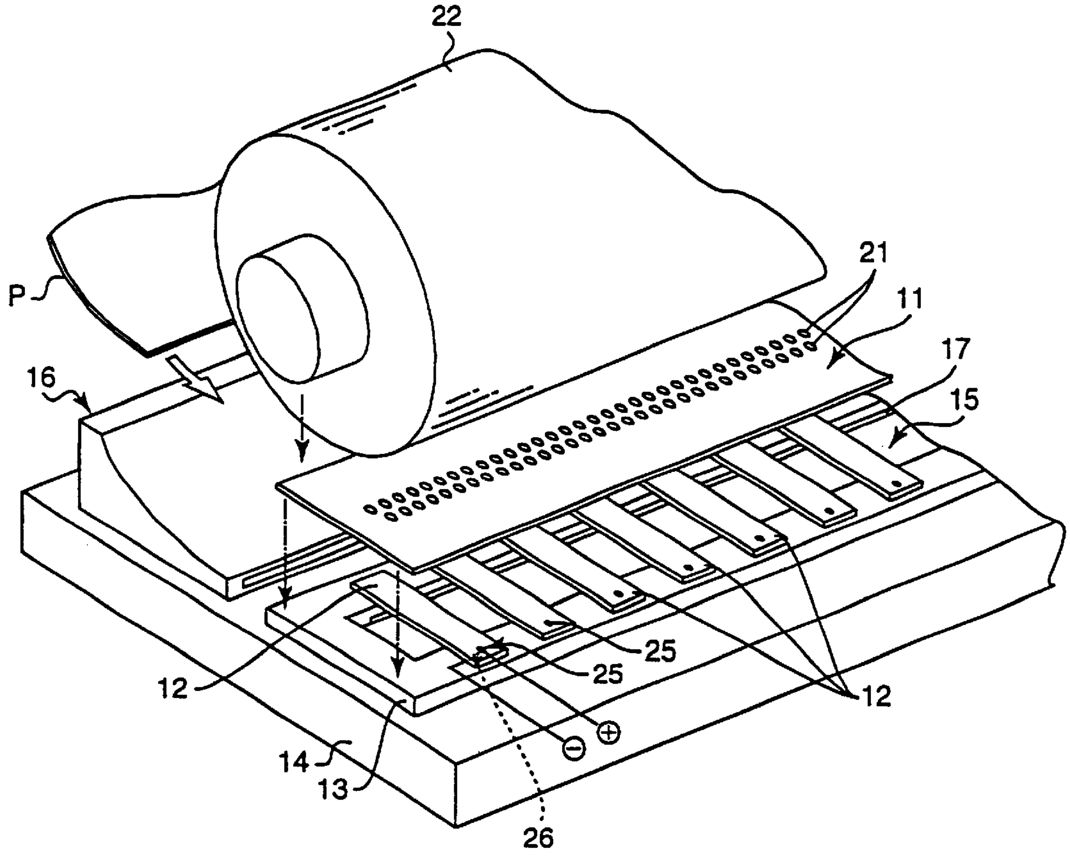
FIG. 2 is a disassembled perspective view of the ink transfer printer.

FIG. 1 is a side sectional view showing an ink transfer printer of a first embodiment of the present invention. FIG. 2 is a disassembled perspective view of the ink transfer printer.

The ink transfer printer has a film 11 and a piezoelectric element 12, which are superposed on each other. The piezoelectric element 12 is fixed on a spacer 13, which is attached to a support plate 14, so that an enclosed ink space 15 is formed by the film 11, the spacer 13 and the support plate 14, thus enabling the ink space 15 to retain ink.

An ink reservoir 16, which contains the ink, is provided on a left side (in FIG. 1) of the ink space 15. A communication channel 17 is formed in the spacer 13 to communicate the ink reservoir 16 with the ink space 15. Thus, the ink in the ink reservoir 16 is supplied to the ink space 15 through the communication channel 17 due to a capillary action. Note that the spacer 13 may be formed from an adhesive material.

The film 11 is a strip, which is made of polytetrafluoroethylene (Teflon (trademark)), with a large number of pores 21 formed therein to allow permeation of the ink. The pores 21 are aligned in two rows, in the longitudinal direction of the film 11. Each of the pores 21 has an inner diameter small enough to restrict the ink to the ink space 15 when no resultant force acts on the film 11.

The pores are formed by punching the film 11 with a needle while the film 11 is heated to above the glass transition temperature at which the film 11 is in the rubber state. When the needle is removed from the film 11, the pore contracts due to the rubber elasticity of the film 11.

A platen roller 22, which is made of rubber, is provided above the film 11, and extends in the longitudinal direction of the film 11. The platen roller 22 is rotated under the control of a control unit 23, and is urged, by a contact mechanism 24, to resiliently bias a recording sheet P into contact with the film 11, so that the platen roller 22 and the film 11 sandwich the recording sheet P. The platen roller 22 is rotated about the axis thereof in a direction A, which feeds the recording sheet P in a direction B, due to a frictional force generated therebetween.

A plurality of the piezoelectric elements 12 are linearly aligned in the longitudinal direction of the film 11. Each of the piezoelectric elements 12 is strip-shaped and extends in a breadth direction of the film 11. A positive terminal 25 is provided on a surface of each of the piezoelectric elements 12, and a negative terminal 26 is provided on another surface of each of the piezoelectric elements 12. The terminals 25 and 26 are connected to the control unit 23, enabling an electric voltage to be applied to the terminals 25 and 26, whereby the piezoelectric elements 12 vibrate relative to the film 11, i.e. towards and away from the film 11.

Figure 3:
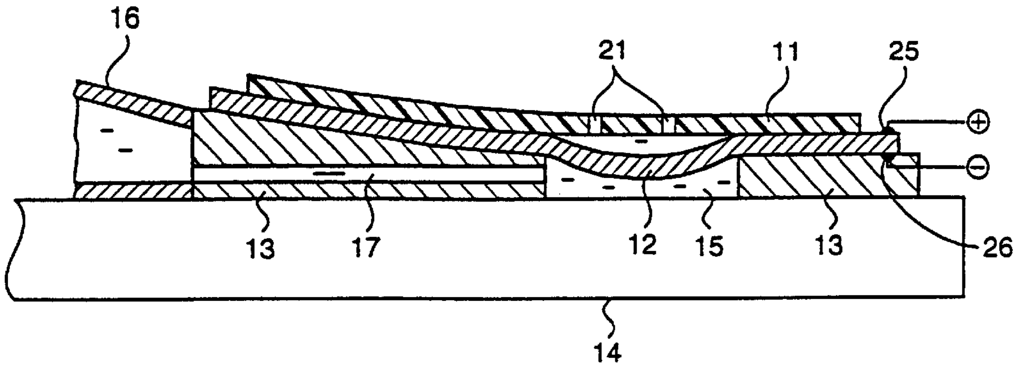
FIGS. 3 and 4 are sectional views showing a principle by which an image is formed on a recording sheet using the ink transfer printer of the first embodiment.
Figure 4:
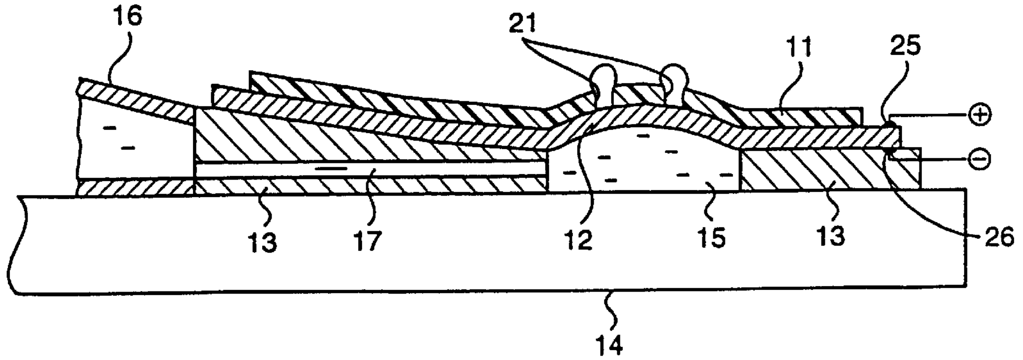

FIGS. 3 and 4 are sectional views showing a principle by which an image is formed on the recording sheet P using the ink transfer printer. Note that, in FIGS. 3 and 4, the platen roller 22 and the recording sheet P are omitted.

As described above, when no resultant force acts on the film 11, the inner diameter of each of the pores 21 is very small so that the ink is blocked and does not flow therethrough. Conversely, when an electric voltage is applied to each of the piezoelectric elements 12, the piezoelectric elements 12 vibrate upward and downward. Namely, during vibration, the piezoelectric elements 12 approach to and separate from the film 11. When the piezoelectric elements 12 are displaced downward, ink enters the region between the piezoelectric elements 12 and the film 11, as shown in FIG. 3. When the piezoelectric elements 12 are displaced upward, the ink is forced by the piezoelectric elements 12 to pass through the pores 21, as shown in FIG. 4. The ink passing through the pores 21 is transferred onto the recording sheet P (FIG. 1), which is in contact with the film 11.

Therefore, according to the ink transfer printer of the first embodiment, the control unit 23 selectively drives the piezoelectric elements 12 and controls the platen roller 22, in accordance with image information transmitted to the control unit 23, so that an image is formed or printed on the recording sheet P.

Thus, since the ink transfer printer of the first embodiment is constructed in such a manner that the ink passes through the pores 21 due to the vibration of the piezoelectric elements 12, the electric power consumption is reduced in comparison with an ink transfer printer in which ink is heated to evaporation and the vapor pressure is utilized to carry out a printing operation.

Figure 5:
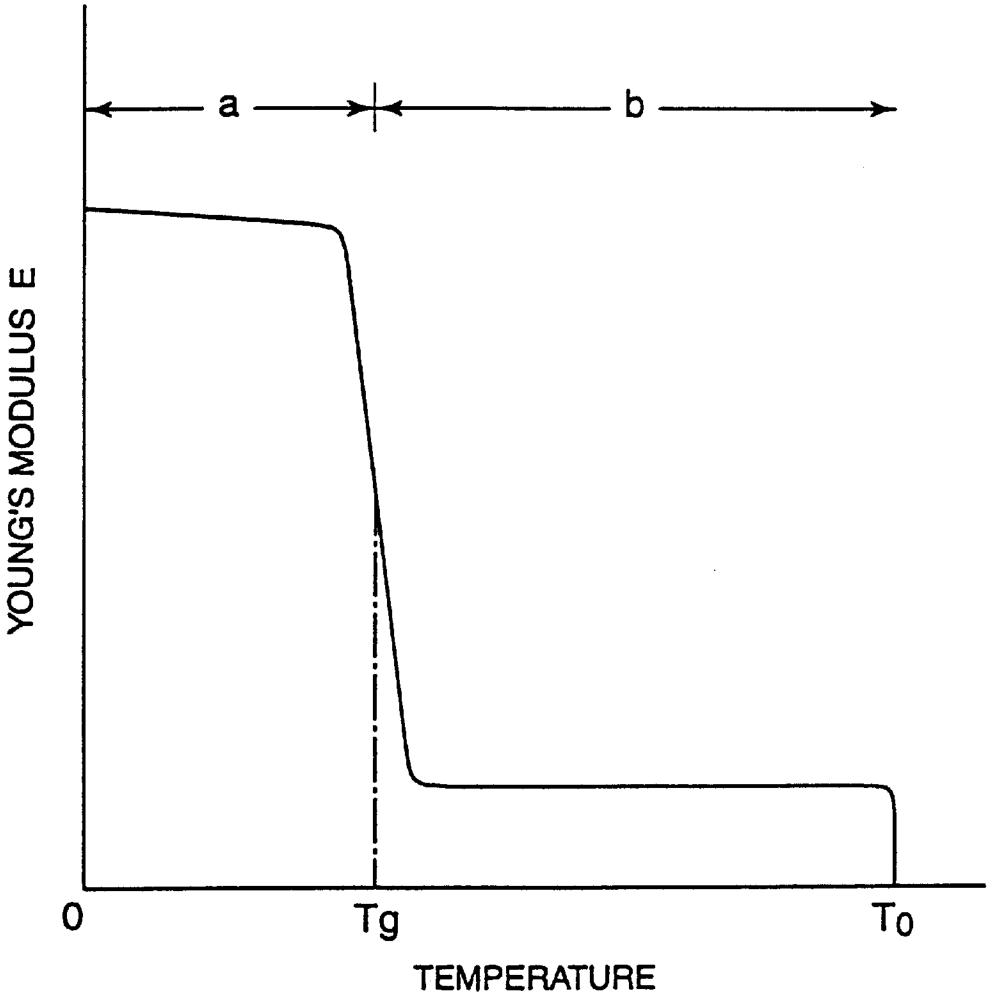
FIG. 5 is a view showing a relationship between temperature and the Young's modulus of shape memory resin.
Figure 6:
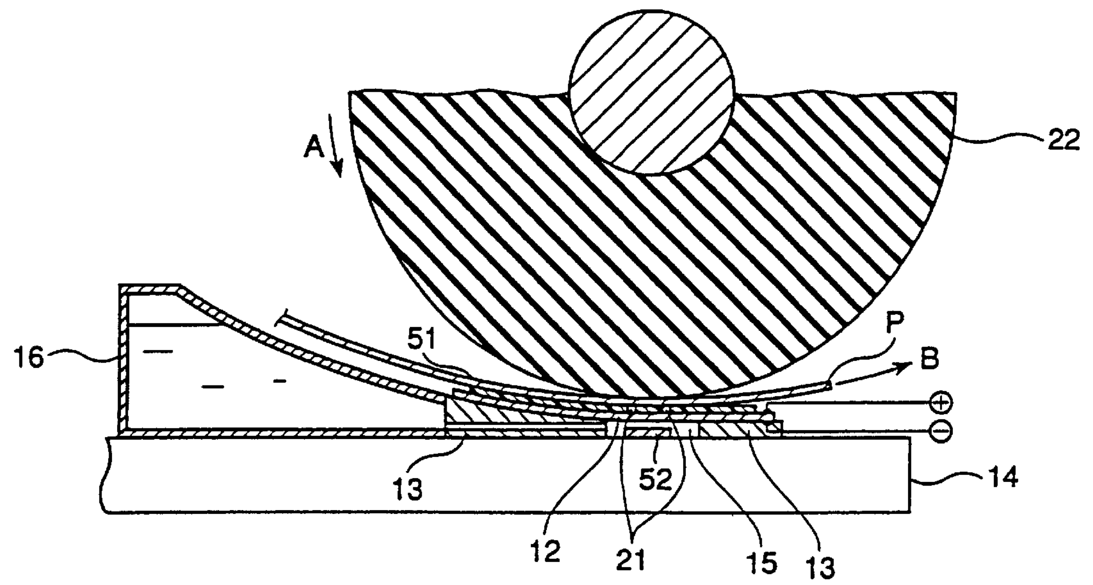
FIG. 6 is a side sectional view showing an ink transfer printer of a second embodiment of the present invention.

A second embodiment of the present invention will be described below with reference to FIGS. 5 and 6. As shown in FIG. 6, the ink transfer printer of the second embodiment shares most of the elements of the first embodiment, incorporating the features described with reference to FIGS. 1–4 (e.g., elements having reference numerals 1–10 and 12–26 and their described functions). Accordingly, a description of those elements already described with reference to the first embodiment (i.e., those having the same reference numerals and having the same functions) is omitted.

In the second embodiment, a film 51 is made of shape memory resin. FIG. 5 shows a relationship between temperature and the Young's modulus of the shape memory resin. The shape memory resin exhibits rubber elasticity above the glass transition temperature Tg due to the active micro-Brownian motion of molecular chains (region (b)), whereas it exhibits the glassy state below the glass transition temperature Tg due to the freezing of the micro-Brownian motion (region (a)).

Namely, the shape memory resin can be arbitrarily deformed by heating it to above the glass transition temperature Tg, and a fixed shape can be obtained by cooling it to below Tg. The original shape of the shape memory resin can then be recovered by again heating it to Tg or higher. In this embodiment, the range of the glass transition temperature Tg is between 50° C. and 130° C. The shape memory resin can be made of polynorbornene, trans-1, 4-polyisoprene, polyurethane or the like. In this embodiment, a polyurethane resin, which is low cost and has excellent moldability, is used.

As shown in FIG. 6, the support plate 14 is provided with a heater 52 so that the film 51 can be heated to above the glass transition temperature Tg. The heater 52 extends in the longitudinal direction of the film 51, i.e. in parallel to the rotational axis of the platen roller 22, so that the film 52 can be uniformly heated in the longitudinal direction. The temperature to which the heater 52 is heated is preferably between 50° C. and 80° C., and in this embodiment, it is set to 55° C. if the heating temperature is lower than 50° C., the ink may ooze through the film 51 when an ambient air temperature is very high, such as in summer. Conversely, the higher the heating temperature, the greater the amount of consumed electric power in the heater 52, and therefore, the upper limit of the heating temperature is preferably around 80° C. The structures other than the film 51 and the heater 52 are the same as those of the first embodiment.

By pre-heating the film 51 to beyond the glass transition temperature Tg with the heater 52, the film 51 exhibits rubber elasticity, and the pores 21 perforating the film 51 can be deformed. Note that it is preferable that the heating temperature of the heater 52 remains below approximately 200° C., being the temperature at which the ink evaporates, and heats to above the glass transition temperature Tg of the film 51.

On the other hand, when the ink transfer printer is not in use, the film 51 exhibits the glass state since the film 51 is not being heated by the heater 52, and the pores 21 of the film 51 are negligibly deformed. Namely, the pores 21 hardly expand, so that the ink is prevented from passing through the pores 21 even when the ink transfer printer, not in use, is subjected to a shock or external impact. Thus, ink leakage is prevented in the ink transfer printer when not in operation.

According to the ink transfer printer of the second embodiment, although electric power consumption will increase, because of the heater 52, in comparison with the first embodiment, ink leakage is surely prevented when the printer is not in operation.

Although the embodiments of the present invention have been described herein with reference to the accompanying drawings, obviously many modifications and changes may be made by those skilled in this art without departing from the scope of the invention.

The present disclosure relates to subject matter contained in Japanese Patent Application No. 9-293487 (filed on Oct. 9, 1997) which is expressly incorporated herein, by reference, in its entirety.

What is claimed is:

1. An ink transfer printer comprising:

a film, having a longitudinal direction and a breadth direction perpendicular to said longitudinal direction, said film extending in the longitudinal direction entirely across a sheet feeding path of said ink transfer printer, said film including a plurality of pores arranged along the longitudinal direction and which perforate said film;

an enclosure forming an elongated ink space, the elongated ink space extending along the longitudinal direction of the film entirely across all of said pores;

a plurality of piezoelectric elements, each piezoelectric element being disposed to face said film and extending in the breadth direction of said film, and each piezoelectric element vibrating to be displaced toward and away from said film and dipping into supplied ink in the elongated ink space when displaced away from said film;

an ink reservoir that contains and supplies the ink to the elongated ink space; and a contact mechanism that urges a recording sheet to contact a surface of said film positioned opposite to said piezoelectric element;

said ink passing through said pores and transferring to said recording sheet due to said vibrating piezoelectric elements.

2. An ink transfer printer according to claim 1, further comprising a moving mechanism that moves said recording sheet relative to said film, and a control unit that controls said piezoelectric elements and said moving mechanism in accordance with image information.

3. An ink transfer printer according to claim 2, wherein said plurality of piezoelectric elements are linearly aligned so that a line head is formed, and said moving mechanism moves said recording sheet in a first direction perpendicular to a second direction in which said piezoelectric elements are aligned.

4. An ink transfer printer according to claim 3, wherein said contact mechanism comprises a platen roller disposed in parallel to said second direction, said recording sheet being securely interposed between said platen roller and said film.

5. An ink transfer printer according to claim 4, wherein said recording sheet is moved in accordance with a rotational movement of said platen roller.

6. An ink transfer printer according to claim 1, wherein said film is made of shape-memory resin that exhibits a rubber elasticity above the glass transition temperature and exhibits a glassy state below the glass transition temperature.

7. An ink transfer printer according to claim 6, wherein the glass transition temperature is higher than 50° C.

8. An ink transfer printer according to claim 1, further comprising a heater that heats said film to above the glass transition temperature.

9. An ink transfer printer according to claim 8, wherein said heater heats said film to between 50° C. and 80° C.

10. An ink transfer printer according to claim 9, wherein said heater heats said film to approximately 55° C.

11. The ink transfer printer according to claim 1, wherein said pores are aligned in a longitudinal direction of the elongated ink space.

12. An ink transfer printer comprising:

a film, having a longitudinal direction and a breadth direction perpendicular to said longitudinal direction, said film extending in the longitudinal direction entirely across a sheet feeding path of said ink transfer printer, said film including a plurality of pores arranged along the longitudinal direction and which perforate said film;

an enclosure bounded on at least one side by said film forming an elongated ink space, the elongated ink space extending along the longitudinal direction of the film entirely across all of said pores;

a plurality of piezoelectric elements, each piezoelectric element being disposed in the proximity of said film and extending in the breadth direction of said film, and each piezoelectric element vibrating to be displaced toward and away from said film and dipping into supplied ink in the elongated ink space when displaced away from said film when electrically energized;

an ink reservoir that supplies the ink to the elongated ink space; and a contact mechanism that urges a recording sheet to contact a surface of said film, positioned opposite to said piezoelectric element;

said ink passing through said pores and transferring to said recording sheet due to said vibrating piezoelectric elements.

* * * * *